(12) United States Patent
Liddy

(10) Patent No.: US 6,829,613 B1
(45) Date of Patent: Dec. 7, 2004

(54) TECHNIQUES FOR CONTROLLING DISTRIBUTION OF INFORMATION FROM A SECURE DOMAIN

(75) Inventor: Elizabeth D. Liddy, Syracuse, NY (US)

(73) Assignee: Technology Innovations, LLC, W. Henrietta, NY (US)

( * ) Notice: Subject to any disclaimer, the term of this patent is extended or adjusted under 35 U.S.C. 154(b) by 0 days.

(21) Appl. No.: 10/137,740

(22) Filed: Apr. 30, 2002

(Under 37 CFR 1.47)

Related U.S. Application Data

(63) Continuation of application No. 09/942,027, filed on Aug. 28, 2001, which is a continuation of application No. 09/699,288, filed on Oct. 26, 2000, now abandoned, and a continuation-in-part of application No. 09/280,288, filed on Mar. 29, 1999, now Pat. No. 6,263,335, which is a continuation of application No. 08/795,658, filed on Feb. 6, 1997, now Pat. No. 6,076,088.

(60) Provisional application No. 60/161,792, filed on Oct. 27, 1999, provisional application No. 60/015,512, filed on Apr. 16, 1996, and provisional application No. 60/011,369, filed on Feb. 9, 1996.

(51) Int. Cl.⁷ ............................................. G07F 17/30
(52) U.S. Cl. ............................................. 707/10; 707/5
(58) Field of Search ........................................ 707/1–10

(56) References Cited

U.S. PATENT DOCUMENTS 5,781,879 A * 7/1998 Arnold et al. ................. 704/9
5,850,219 A * 12/1998 Kumomura ................. 345/751
6,006,221 A * 12/1999 Liddy et al. ................... 707/5
6,044,205 A * 3/2000 Reed et al. ................. 709/201

OTHER PUBLICATIONS

IBM, Enhancing Knowledge Base Security and Efficiency, IBM technical Disclosure Bulletin, Apr. 1, 1993, vol. 36 Issue 4, pp. 131–134.*

* cited by examiner

*Primary Examiner*—Jack M Choules
(74) *Attorney, Agent, or Firm*—Townsend and Townsend and Crew LLP

(57) ABSTRACT

Techniques for controlling distribution of information from a secure domain by automatically detecting outgoing messages which violate security policies corresponding to the secure domain. Semantic models are constructed for one or more message categories and for the outgoing messages. The semantic model of an outgoing message is compared with the semantic models of the message categories to determine a degree of similarity between the semantic models. The outgoing message is classified based on the degree of similarity obtained from the comparison. A determination is made, based on the classification of the outgoing message, if distribution of the outgoing message would violate a security policy for the secure domain. Distribution of the outgoing message is allowed if no security policy is violated.

55 Claims, 6 Drawing Sheets

TECHNIQUES FOR CONTROLLING DISTRIBUTION OF INFORMATION FROM A SECURE DOMAIN

CROSS-REFERENCES TO RELATED APPLICATIONS

This application claims priority from the following applications, the entire disclosures of which are herein incorporated by reference for all purposes:

(1) U.S. Provisional Patent Application No. 60/161,792 filed Oct. 27, 1999; and is a continuation of application Ser. No. 09/942,027 filed Aug. 28, 2001, which is a continuation-in-part of, (2) U.S. patent application Ser. No. 09/280,228 filed Mar. 29, 1999, now U.S. Pat. No. 6,263,335 which is a continuation of and claims the benefit of U.S. patent application Ser. No. 08/795,658 (which issued as U.S. Pat. No. 6,076,088), filed Feb. 6, 1997, which in turn claims priority from U.S. Provisional Application No. 60/015,512 filed Apr. 16, 1996 and U.S. Provisional Application No. 60/011,369, filed Feb. 9, 1996, the entire disclosures of which are herein incorporated by reference for all purposes.

This application also incorporates by reference the following documents in their entirety for all purposes:

(1) U.S. patent application Ser. No. 08/696,701 filed Aug. 14, 1996 which issued as U.S. Pat. No. 6,006,221;

(2) U.S. patent application Ser. No. 08/698,472 filed Aug. 14, 1996 which issued as U.S. Pat. No. 5,963,940; and (3) U.S. patent application Ser. No. 08/696,702 filed Aug. 14, 1996 which issued as U.S. Pat. No. 6,026,388.

APPENDIX

The following appendix is being filed with this application, the entire contents of which are herein incorporated by reference for all purposes:

Appendix A (30 pages)—"Guard-if" Document

BACKGROUND OF THE INVENTION

The present invention relates generally to the field of computer data security and content-based filtering of information. In particular, the present invention relates to the application of natural language processing (NLP) and information retrieval techniques to classification of information based on its content, and controlling the distribution or dissemination of the information based on the classification.

With the widespread use of computers, an expanding telecommunication network, and the rising popularity of the Internet, an increasing amount of information is now being stored and communicated/distributed in electronic form for both personal and business purposes. Although increased connectivity has facilitated the free flow of information, it has also created data security problems for organizations and individuals who wish to prevent access to or prevent spread of sensitive information from secure domains to the non-secure outside world. In particular, communication techniques such as electronic mail (E-Mail), electronic faxes, and the like, have made the networks of these organizations susceptible to information leakage problems whereby sensitive information is transmitted to unauthorized users by processes/entities with legitimate access to the information.

For example, a corporation may be very interested in preventing the distribution of inappropriate information such as trade secrets, hate messages, indecent materials, etc. which may expose the corporation to monetary damages, adverse legal action, or even the corporation's reputation. Government and military organizations may be very interested in preventing leakage of sensitive information from their secure networks to the outside world. Likewise, organizations such as hospitals, banks, and credit agencies may want to prevent the dissemination of patient and client information to unauthorized users.

Traditionally, organizations have attempted to reduce information leakage by employing security personnel who manually monitor the contents of information carrying messages which originate in a secure domain and whose destination lies outside the secure domain or of messages whose sender is a member of a secure domain but whose recipient is not a member of the secure domain. The outgoing messages are allowed to leave the boundaries of the secure domain only if the contents of the outgoing messages do not violate predefined security policies for that secure domain. While this approach is effective in controlling the spread of sensitive information, it is very human resource intensive and thus very expensive.

Currently, a number of security products are available which automate the task of controlling the dissemination of information from a secure domain. These security products are designed to monitor the contents of outgoing messages passing from secure domains and flag those messages which violate security policies. These tools are commonly referred to as "boundary controllers" since they monitor the contents of outgoing messages crossing the boundary of a secure domain to the outside world. An example of such a security product is the MINEsweeper product from Integralis (Content Technologies, Inc.).

The boundary controllers described above monitor the contents of outgoing messages based on a "keyword list" or "dirty word" list. The boundary controllers are configured to flag outgoing messages which contain one or more keywords contained in the keyword list or dirty word list. This approach is lexically based and thus can be easily circumvented by using "innocent" words in the outgoing message instead of the "dirty" words. Further, since the nature of sensitive information can change dynamically, the keywords list needs to be continually updated which is administratively cumbersome. Additionally, since the boundary controllers use simple word matching techniques, they cannot take into account that a particular "dirty" word can be used in various different contexts, not all of which should be flagged. Consequently, conventional boundary controllers are often plagued by errors and inconsistencies and as a result cannot assure information security.

Thus, there is a need for a system and method which can provide greater information security than that offered by prior art techniques.

SUMMARY OF THE INVENTION

The present invention describes a system, method, and computer program for controlling distribution of a message from a secure domain to a destination outside the secure domain. According to an embodiment, the present invention constructs semantic models for a plurality of message categories and for outgoing messages. The semantic model of an outgoing message is then compared with the semantic models of the plurality of message categories and the outgoing message is classified based on the comparison. The present invention then uses the classification information for the message to determine if the message can be distributed outside the secure domain.

According to an embodiment, the present invention compares the semantic model of the message with the semantic models for the plurality of message categories and determines a degree of similarity between the semantic model of the message and the semantic model for each message category in the plurality of message categories. A message is classified as belonging to a message category if the degree of similarity between the semantic model of the message and the semantic model of the message category exceeds a threshold degree of similarity. The threshold degree of similarity may be user-defined.

According to another embodiment, the present invention determines if the message can be distributed to a recipient outside the secure domain by determining if the message violates a security policy. The present invention may determine a security clearance level for the sender of the message, the recipient, and for the message category to which the message was classified. The present invention may indicate that the message violates the security policy if the security clearance level of the sender or recipient is lower than the security clearance level of the message category. In case of a security policy violation, the present invention may prevent distribution of the message to the recipient. Messages which do not violate any security policies may be forwarded to the recipient According to another embodiment of the present invention, information about unclassified message is presented to the user via a graphical user interface to facilitate manual classification. The graphical user interface allows a user to manually classify the message. The graphical user interface may also allow the user to indicate if the message violates a security policy.

According to yet another embodiment of the present invention, manually classified messages may be forwarded to a machine learning module which compares the semantic representations of the manually classified message and the message category to which the message was manually classified. The semantic model of the message category may be updated based on the comparison.

The invention will be better understood by reference to the following detailed description and the accompanying figures.

DESCRIPTION OF THE SPECIFIC EMBODIMENTS

Figure 1:
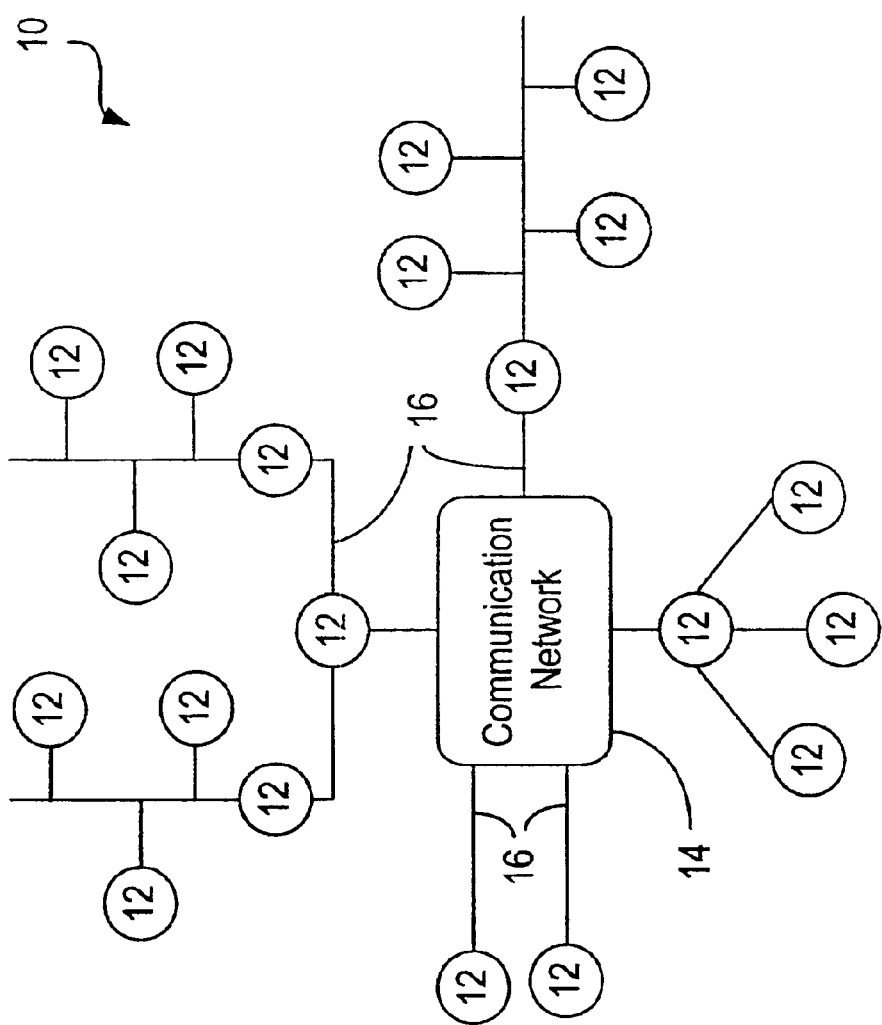
FIG. 1 is a simplified block diagram of a distributed computer network 10 incorporating an embodiment of the present invention.

FIG. 1 is a simplified block diagram of a distributed computer network 10 incorporating an embodiment of the present invention. Computer network 10 includes a number of computers systems 12 coupled with a communication network 14 via a plurality of communication links 16. Communication network 14 and communication links 16 provide a mechanism for allowing the various components of computer network 10 to communicate and exchange information with each other. Communication network 14 may itself be comprised of many interconnected computer systems and communication links. Communication links 16 may be hardwire links, optical links, satellite or other wireless communications links, wave propagation links, or any other mechanisms for communication of information. While in one embodiment, communication network 14 is the Internet, in other embodiments, communication network 14 may be any suitable computer network. Distributed computer network 10 depicted in FIG. 1 is merely illustrative of an embodiment incorporating the present invention and does not limit the scope of the invention as recited in the claims. One of ordinary skill in the art would recognize other variations, modifications, and alternatives.

The present invention is a meaning-based boundary controller which controls the distribution of information crossing the boundary of a secure domain by automatically detecting outgoing messages which violate security policies corresponding to that security domain. Distributed computer network 10 may include one or more security domains. A secure domain may be configured to include a single computer system, or a plurality of computer systems, a LAN, a WAN, or the like. A secure domain may also be configured to include one or more processes executing on a computer system. For example, for a newsgroup application, the people who submit messages to the newsgroup can be considered as belonging to one secure domain, and the newsgroup itself can be considered as belonging to another secure domain, and the boundary between these two domains may be controlled by the present invention.

Figure 2:
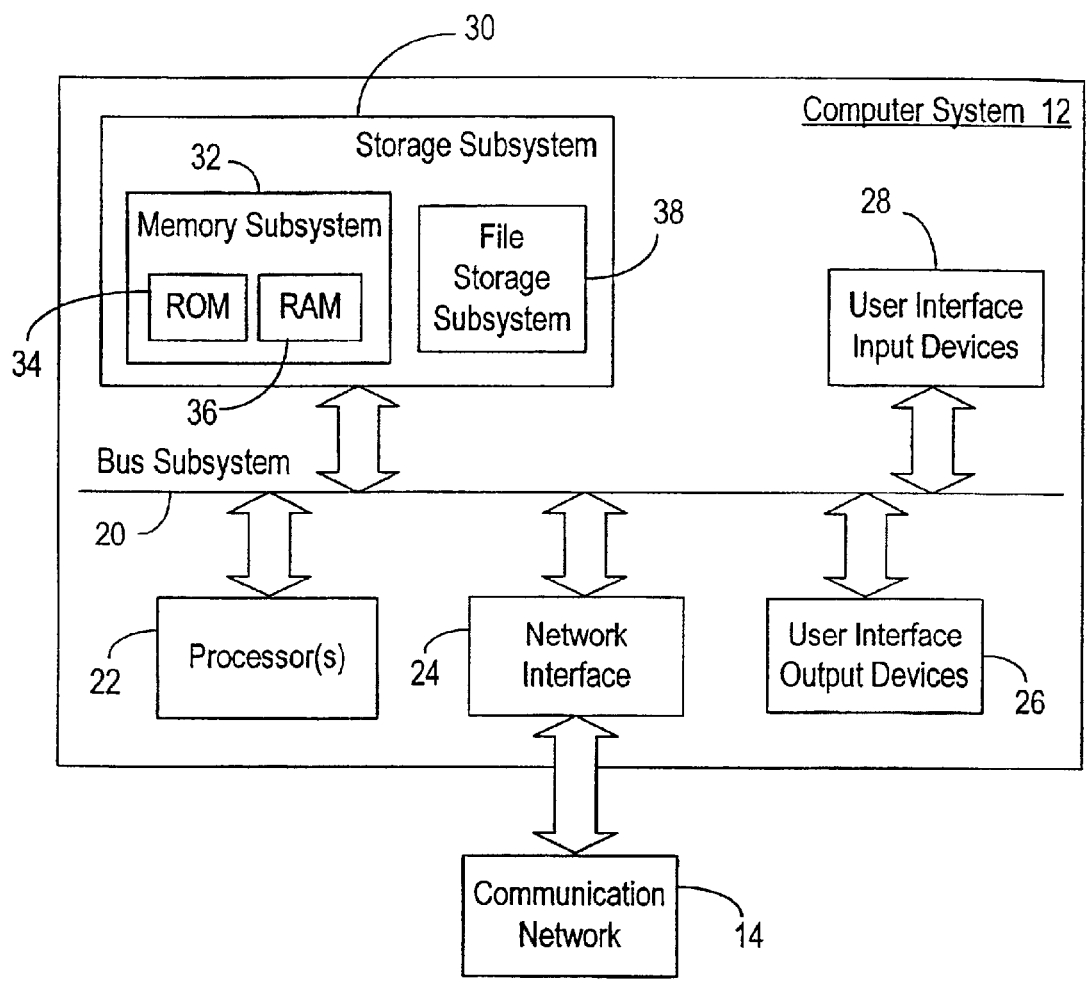
FIG. 2 is a simplified block diagram of computer system incorporating an embodiment of the present invention.

FIG. 2 is a simplified block diagram of computer system 12 incorporating an embodiment of the present invention. Computer system 12 typically includes at least one processor 22 which communicates with a number of peripheral devices via bus subsystem 20. These peripheral devices typically include a storage subsystem 30, comprising a memory subsystem 32 and a file storage subsystem 38, user interface input devices 28, user interface output devices 26, and a network interface subsystem 24. The input and output devices allow human interaction with computer system 12. Network interface subsystem 24 provides an interface to outside networks, including an interface to communication network 14, and is coupled via communication network 14 to corresponding interface devices in other computer systems.

User interface input devices 28 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 12 or onto computer network 14.

User interface output devices 26 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 12 to a human or to another machine or computer system.

Storage subsystem 30 stores the basic programming and data constructs that provide the functionality of the various systems embodying the present invention. For example, the various modules implementing the functionality of the present invention may be stored in storage subsystem 30. These software modules are generally executed by processor 22. In a distributed environment, the software modules may be stored on a plurality of computer systems and executed by processors of the plurality of computer systems. Storage subsystem 30 typically comprises memory subsystem 32 and file storage subsystem 38.

Memory subsystem 32 may include a number of memories including a main random access memory (RAM) 36 for storage of instructions and data during program execution and a read only memory (ROM) 34 in which fixed instructions are stored. File storage subsystem 38 provides persistent (non-volatile) storage for program and data files, and may include a hard disk drive, a floppy disk drive along with associated removable media, a Compact Digital read Only Memory (CD-ROM) drive, an optical drive, or removable media cartridges. One or more of the drives may be located at remote locations on other connected computers at another site on communication network 14.

Bus subsystem 20 provides a mechanism for letting the various components and subsystems of computer system 12 communicate with each other as intended. The various subsystems and components of computer system 12 need not be at the same physical location but may be distributed at various locations within distributed network 10. Although bus subsystem 20 is shown schematically as a single bus, alternate embodiments of the bus subsystem may utilize multiple busses.

Computer system 12 itself can be of varying types including a personal computer, a portable computer, a workstation, a computer terminal, a network computer, a television, a mainframe, or any other data processing system. Due to the ever-changing nature of computers and networks, the description of computer system 12 depicted in FIG. 2 is intended only as a specific example for purposes of illustrating an embodiment of the present invention. Many other configurations of computer system 12 are possible having more or less components than the computer system depicted in FIG. 2.

Figure 3:
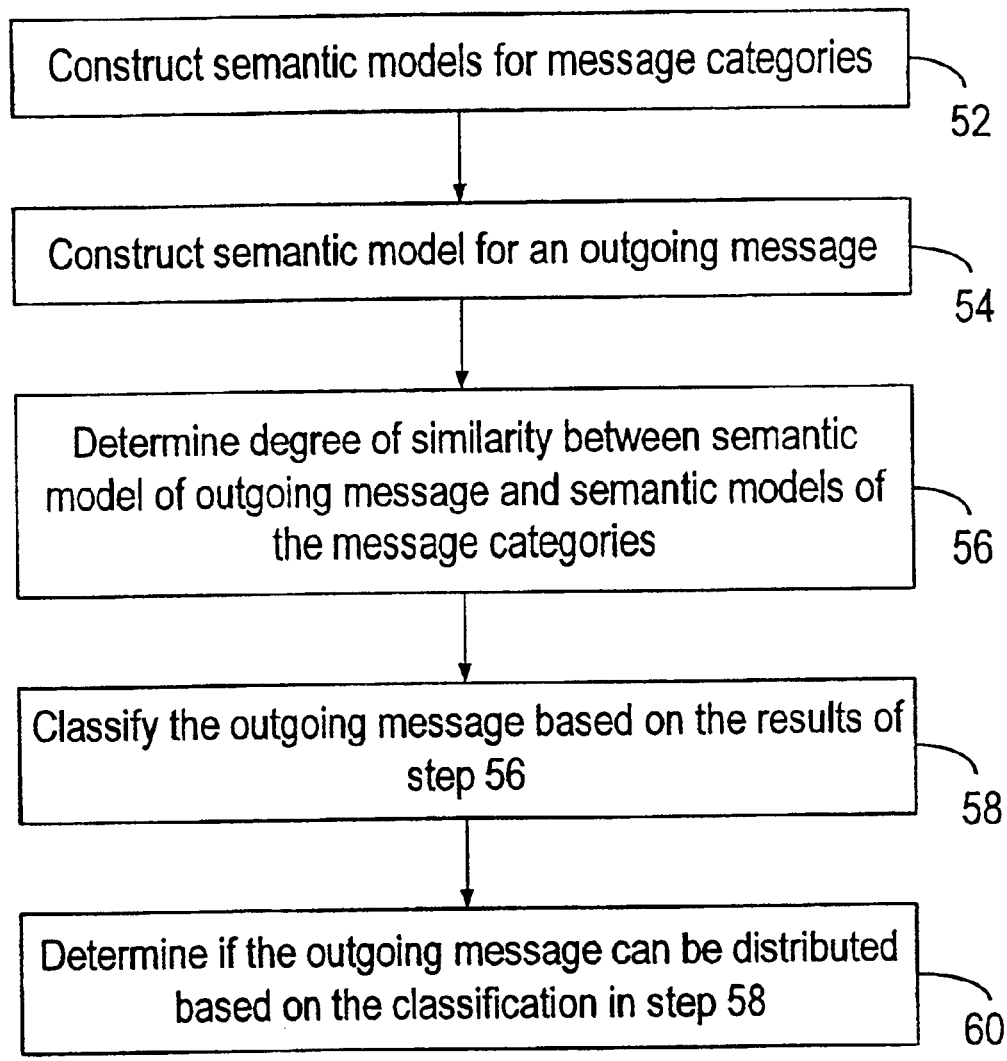
FIG. 3 is a simplified high-level flowchart depicting various steps for controlling the distribution of information from a secure domain, according to an embodiment of the present invention.

FIG. 3 depicts a simplified high-level flowchart 50 depicting various steps for controlling the distribution of information from a secure domain, according to an embodiment of the present invention. These steps are typically performed by a boundary controller computer system which is responsible for controlling the flow of information crossing the boundary of that secure domain. The steps may be performed by various modules resident on the boundary controller computer system, and executed by a processor within the boundary controller computer system. In alternate embodiments, the steps depicted in flowchart 50 may be performed by a plurality of computer systems 12.

The task of controlling flow of information from a secure domain typically involves classifying the information carrying message into one or more categories based on the contents of the message, followed by determining if the message violates any security policies based on the classification. As depicted in FIG. 3, in order to facilitate classification of outgoing messages, the present invention constructs semantic models for one or more message categories (step 52). The message categories along text describing the message categories are usually provided by the user of the present invention. The present invention then constructs a semantic model for an outgoing message based on the contents of the outgoing message (step 54). The semantic model of the outgoing message is then compared with the semantic models of the message categories constructed in step 52 to determine a degree of similarity between the semantic models (step 56). The outgoing message may then be classified based on the degree of similarity obtained from the comparison performed in step 56 (step 58). The present invention may then determine if the outgoing message can be distributed outside the secure domain based on the classification of the outgoing message (step 60). Each of the steps shown in FIG. 3 are described below in further detail.

Figure 4:
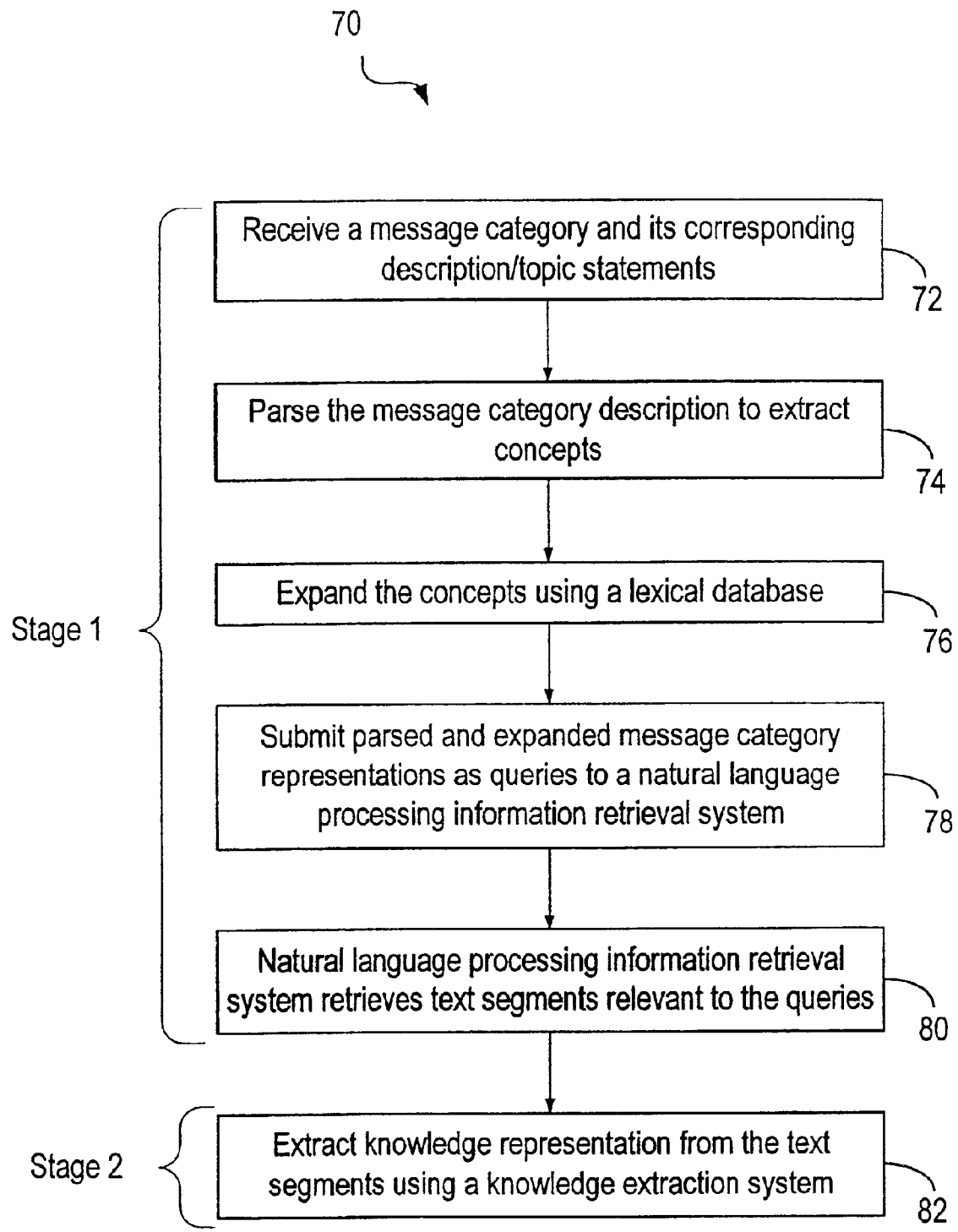
FIG. 4 is a simplified flow chart depicting various steps for constructing a semantic model for a message category according to an embodiment of the present invention.

FIG. 4 depicts a flow chart 70 showing various steps performed by the present invention for constructing a semantic model for a message category (step 52 in FIG. 3). Broadly, the step of constructing a semantic model for a message category may be accomplished in two stages. During the first stage, the present invention uses natural language processing and information retrieval techniques to generate a set of text segments that are closely related to the meaning of the message category as described by the message category descriptive text provided by the user. The first stage typically includes steps 72, 74, 76, 78, and 80 shown in FIG. 4. During the second stage, the present invention extracts structured knowledge representation for the message category from the set of text segments retrieved in stage one. The second stage typically includes step 82 shown in FIG. 4. The knowledge representations extracted from the text segments constitute a semantic model for the corresponding message category. Each of these steps are described below in further detail.

As depicted in FIG. 4, the present invention receives textual description (or topic statements) corresponding to the message category for which a semantic model is to be built (step 72). The message category along with its associated description may be input by a user of the present invention or may alternatively be retrieved or generated automatically from one or more classification guides accessible to the present invention. A classification guide typically contains a list of message categories, their descriptions, and their corresponding classification levels. An example of such a classification guide is the declassified TRADOC Standard Security Classification Guide used by the Department of Defense. Examples of classified message categories listed in the TRADOC guide include "quantities of specific items of equipment"; "weather impacts on operations", "ammunition expenditures," etc. and the associated security clearance levels may be "Secret," "Top Secret," "Confidential," etc. Many different types of message categories and their descriptions may be input to the present invention.

The message category description or topic statements are then parsed into their concepts (step 74). The present invention then expands the concepts using a comprehensive lexical database (step 76). An example of a lexical database is the WordNet lexical database. WordNet is an ontology which organizes concepts using various semantic relations such as synonyms or hyponyms. The parsed and expanded message category representations are then submitted as queries to a natural language processing information retrieval (NLPIR) system (step 78). An example of a natural language processing information retrieval system is the "DR-LINK" system developed by Textwise LLC of Syracuse. For further information on the DR-LINK system, please refer to U.S. patent application Ser. No. 08/698,472 filed Aug. 14, 1996 which issued as U.S. Pat. No. 5,963,940, and U.S. patent application Ser. No. 08/696,702 filed Aug. 14, 1996 which issued as U.S. Pat. No. 6,026,388, the entire disclosures of which are herein incorporated by reference for all purposes.

In response to the queries, the natural language processing information retrieval system retrieves a set of text segments relevant to the queries from a document collection accessible to the natural language processing information retrieval system (step 80). The document collection typically contains documents, texts, etc. which contain information relevant to the message category. The present invention can process any type of text, and is thus a domain-independent system which is easily scalable. For example, for a message category related to a military environment, the document collection may include military manuals, military procedure documents, statements of military doctrine, etc. Similarly, for a message category related to a product in a corporate setting, the document collection may include design documents for the product, user's manuals for the product, marketing reports for the product, and the like. The text segments output by the natural language processing information retrieval system expand the representation of the message category description by providing examples of the topic, by indicating synonymous phrasings of the topic, etc. These text segments form the basis for generating an enriched knowledge representation for the corresponding message category.

A knowledge extraction system then extracts rich structured knowledge representations from the text segments retrieved in step 80 (step 82). An example of a knowledge extraction system is the "KNOW-IT" system, developed by Textwise LLC of Syracuse. The KNOW-IT system accepts text as input and extracts semantic relations between the concepts expressed in the texts. These concepts and relations provide a representation of the meaning expressed by the texts. The concepts and relations are represented as "concept-relation-concept" triples (or CRCs), or "relation-concept" tuples (or RCs). The CRCs and RCs encapsulate a generalized representation of the structure and meaning of each text segment. The set of CRCs and RCs extracted from the text segments constitute a semantic model of the structured meaning of the corresponding message category. For further information on the use CRCs and RCs please refer to U.S. patent application Ser. No. 08/795,658 filed Feb. 6, 1997 which issued as U.S. Pat. No. 6,076,088, and U.S. patent application Ser. No. 09/280,228 filed Mar. 29, 1999, the entire disclosures of which are herein incorporated by reference for all purposes. The knowledge representations assigned to the text segments constitute a semantic releasability model for the corresponding message category.

Figure 5:
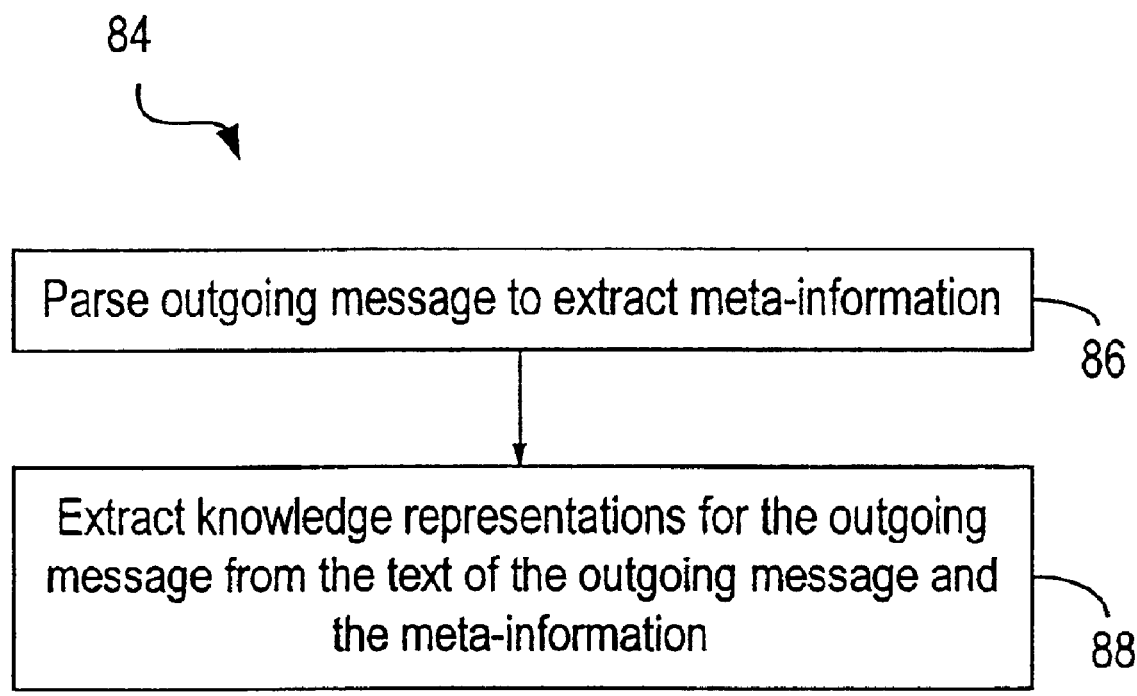
FIG. 5 is a simplified flow chart showing various steps for constructing a semantic model for an outgoing message according to an embodiment of the present invention.

FIG. 5 depicts a flow chart 84 showing various steps performed by the present invention for building a semantic model for an outgoing message (step 54 of flowchart 50 depicted in FIG. 3). These steps are typically performed in real-time when a boundary controller computer system incorporating the teachings of the present invention receives an outgoing message. The outgoing message may have various different forms such as an E-mail message with or without attachments, newswire text, web pages, HTML documents, etc.

As shown in FIG. 5, the present invention parses the outgoing message to extract meta-information (or functional fields) from the outgoing message (step 86). For example, meta-information for an Email message may include message sender information, message recipient information (information about a direct recipient or a "carbon-copy" recipient), sender's classification level information, a recipient's classification level information, time stamp information for the message, text information for the message, etc. The meta-information may vary for different types of outgoing message or may even vary within the same type of outgoing messages. The contents of the meta-information or the functional fields are then processed by a knowledge extraction system, such as the KNOW-IT system, to extract knowledge representations for the outgoing message (step 88). The knowledge extraction system used for constructing the semantic model for the outgoing message may be the same as or different from the knowledge extraction system used for building semantic models for the message categories. The knowledge representations extracted in step 88 comprise the structured, meaning representation of the message and constitute the semantic model for the outgoing message.

After a semantic model for an outgoing message have been constructed, the semantic model of the outgoing message is compared with the semantic models of the message categories to determine a degree of similarity between the semantic models (step 56 of flowchart 50 depicted in FIG. 3). A similarity metric may be used to assess the degree of similarity between the semantic models. If the degree of similarity exhibited between an outgoing message semantic model and a message category semantic model exceeds a threshold degree of similarity value, the message may be classified as belonging to that message category. A threshold degree of similarity metric may be set separately for each message category, or alternatively, a common threshold may be set for all the message categories. An outgoing message may be classified into one or more message categories.

If none of the comparisons yield a degree of similarity higher than the threshold degree of similarity, the message may be categorized as "unclassified." "Unclassified" messages may include outgoing messages whose semantic models did not exhibit any similarity with the message category semantic models, and/or outgoing messages whose semantic models exhibited some similarity with a message category semantic model, but whose degree of similarity was lower than the threshold degree of similarity for the corresponding message category semantic model.

Unclassified messages may be forwarded to a security officer for manual inspection and classification. According to an embodiment of the present invention, a user interface is provided which displays unclassified messages to the security office in a manner which facilitates efficient and effective manual classification of the messages by the security office. The information displayed by the user interface to facilitate manual classification may include information identifying one or more message categories whose semantic models exhibited some similarity with the unclassified outgoing message semantic model, the text segment of the outgoing message which matched the message category semantic models, the classification level associated with the message categories which exhibited some similarity with the outgoing message, the degree of similarity between the models and the threshold degree of similarity values, and other similar information. The user interface may also allow users to query the present invention for an explanation of why the outgoing message matched one or more message category semantic models. In response the present invention may display the correspondence between the outgoing message and the message category semantic model. Other information which may facilitate classification of the outgoing messages may also be displayed using the user interface.

The threshold degree of similarity metric allows users of the present invention to customize the level of precision and the level of efficiency (or recall) exhibited by the present invention. The level of precision indicates the number of correctly classified messages, and may be calculated by dividing the number of correctly classified messages by the total number of messages which were classified. The level of efficiency reflects the level of automation of the boundary controller, and may be calculated by dividing the number of classified messages by the total number of messages, including classified and unclassified messages. Accordingly, a high level of efficiency indicates a lower number of unclassified messages which have to undergo manual inspection and classification.

Generally, there is a trade-off between precision and efficiency since higher precision usually means lower efficiency, and vice versa Accordingly, setting the precision and efficiency levels essentially amounts to striking a balance between human work load and the risk of an incorrect classification. Lower efficiency and the higher precision implies more work for the security officer but assures that a higher percentage of the messages will be correctly classified.

The present invention allows users to set efficiency and precision levels and thus allows users to customize the performance of the present invention to favor precision or efficiency. For example, in order to improve overall use of system and human resources, the present invention may be configured to generate the minimum number of unclassified messages by lowering the precision threshold. This typically involves lowering the threshold degree of similarity metric for a message category. Conversely, in a highly secure environment such as a military environment, the threshold degree of similarity value may be raised to ensure higher precision. According to an embodiment of the present invention, a "learning module" may be provided which helps to increase both the precision and efficiency of the present invention. Further details about the learning module are provided below.

As an example of how an outgoing message semantic model is compared with message category semantic models, consider a message category such as "Threat Force Organization: composition" (from the TRADOC Standard Scenario Security Classification Guide) which is described by text "the enemy is composed of 2,600 tanks." In this case, "tanks" and "2,600" would be generalized, respectively, to military hardware type and numeric concept type. Accordingly, the meaning of the message category would be represented by three general concepts, namely, enemy type, military hardware type, and numeric concept type. The semantic model for the message category may be represented by a network of semantic relations between these three concepts. Given this semantic representation of the message category, there would be a match between the semantic model and an outgoing message containing the text fragment "Iraq has 400 fighters," since "Iraq," "400," and "fighters" will be respectively typed as an enemy concept a numeric concept, and a military hardware concept, which would match the concepts in the semantic model for the message category.

After an outgoing message has been classified, the present invention may determines, based on the outgoing message classification, if the outgoing message may be distributed outside the boundaries of the secure domain (step 60 of flowchart 60 depicted in FIG. 3). This determination usually depends on security policies instituted by the user for the secure domain. In one embodiment, the boundary controller computer system may be configured to determine the security clearance level of the message category corresponding to the message classification and compare it with the security clearance levels of the outgoing message's sender and recipients. The boundary controller may prohibit distribution of the outgoing message if the security clearance level of the message category is higher (or not compatible) with the security clearance levels of either the sender of the message or the recipients of the message. The outgoing message may be flagged as violating a security policy.

The present invention may be configured to perform user-defined procedures based on whether or not a message violates a security policy. For example, in case of a security violation, the present invention may be configured to log the security violation, and to notify the message sender that the message could not be delivered to the recipients because of a security policy violation. Alternatively, if there is no security violation, the boundary controller may be configured to forward the outgoing message to a mail server for distribution to the recipients. User-defined procedures may be performed on both manually classified messages and messages classified by the boundary controller.

Figure 6:
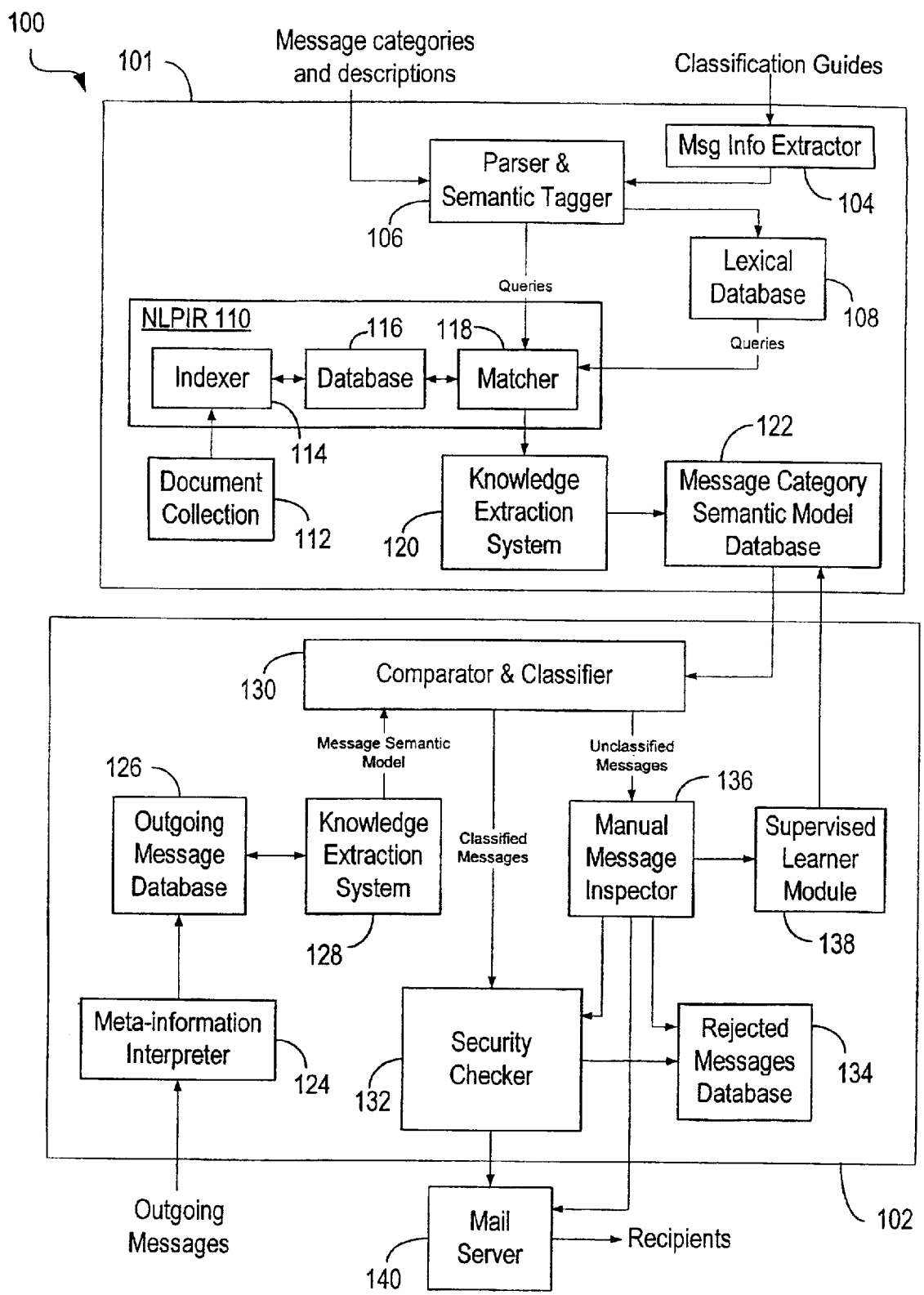
FIG. 6 depicts a block diagram of the various subsystems and components of a boundary controller system according to an embodiment of the present invention.

FIG. 6 depicts a block diagram of the various subsystems and components of a boundary controller system 100 according to an embodiment of the present invention. Broadly, boundary controller system 100 comprises a batch processing subsystem 101 and a real-time processing subsystem 102. Batch processing sub-system 101 is configured to construct semantic models for the various message categories. In the specific embodiment depicted in FIG. 6, batch processing subsystem 101 includes a natural language processing information retrieval (NLPIR) system 110, a message category information extractor 104, a parser and semantic tagger 106, a lexical database 108, a knowledge extraction system 120, and a database 122 for storing the semantic models of the message categories.

Real-time processing subsystem 102 is responsible for constructing semantic models for outgoing messages in real-time, comparing the semantic models of the messages to the semantic models of the message categories, classifying the outgoing messages based on the comparison, and performing appropriate action based on the classification of the outgoing messages. In the specific embodiment depicted in FIG. 6, real-time processing subsystem 102 includes a meta-information interpreter 124, an outgoing message database 126, a knowledge extraction system 128, a semantic model comparator and message classifier 130, a security checker 132, a rejected message database 134, and optionally a manual message inspector 136, and a supervised learner module 138. Each of the modules/components of batch processing subsystem 101 and real-time processing subsystem 102 are described below in further detail. Many other configurations of batch processing subsystem 101 and real time processing subsystem 102 are possible having more or less components than those shown in FIG. 6.

As described above, according to the teachings of the present invention, message categories along with their descriptive information may be input directly by a user, or may alternatively be retrieved from one or more classification guides by message category information extractor 104. The message category information, which includes message category identification information and message category descriptive information, is then forwarded to parser and semantic tagger 106 which uses various syntactic and semantic analysis techniques to parse the message category information and extract concepts which represent the message category.

Parser and semantic tagger 106 may then expand the concepts by consulting lexical database 108. Lexical database 108 is used to assign appropriate synset identifiers to concepts extracted from the message category information. An example of a lexical database is the WordNet lexical database. WordNet is an ontology which organizes concepts using various semantic relations such as synonyms or hyponyms. The WordNet synset assignment process is equivalent to the word sense disambiguation process which selects the most appropriate sense for a word. Accordingly, the WordNet synset assignment is equivalent to the conversion of the word terms into concepts. The synsets associated with a message category provide alternative ways of phrasing the contents of the message category information and thus expand the representation of the message category information to facilitate the information retrieval process.

The expanded message category representations are then passed as queries to NLPIR system 110. As previously stated, the "DR-LINK" system developed by Textwise LLC of Syracuse is an example of a NLPIR system which may be used in accordance with the present invention. For further information on the DR-LINK system, please refer to U.S. patent application Ser. No. 08/698,472 filed Aug. 14, 1996 which issued as U.S. Pat. No. 5,963,940, and U.S. patent application Ser. No. 08/696,702 filed Aug. 14, 1996 which issued as U.S. Pat. No. 6,026,388, the entire disclosures of which are herein incorporated by reference for all purposes.

NLPIR system 110 may include an indexer 114, a database 116, and a matcher 118. NLPIR system 110 also has access to a document collection 112 which stores documents, texts, etc. which may contain information relevant to the various message categories. Indexer 114 accesses information stored in document collection 112 and indexes the text segments from document collection 112 to facilitate information retrieval by NLPIR system 110. Indexer 114 may assign part-of-speech tags to the words in document collection 112, classify proper nouns into semantic categories, identify concept boundaries, etc. Indexer 114 may store the original texts from document collection 112 along with their corresponding syntactic and semantic annotations generated by indexer 114 in database 116. Indexer 114 thus converts raw documents from document collection 112 into a searchable database 116 by recognizing and representing the concepts in the documents. Matcher 118 receives the queries and consults database 116 to retrieve text segments relevant to the queries. The retrieved text segments are then forwarded to knowledge extraction system 120.

Knowledge extraction system 120 uses the text segments as a basis for building semantic models for the message categories. Knowledge extraction system 120 converts the text segments into a knowledge representation which specifies the conceptual meaning of the message category and constitutes the semantic model for the message category. The semantic models generated by knowledge extraction system 120 may be stored in message category semantic model database 122. The semantic information stored in message category semantic model database 122 can then be used to classify outgoing messages.

As previously stated, the "KNOW-IT" system developed by Textwise LLC of Syracuse is an example of a knowledge extraction system which may be used in accordance with the present invention. The KNOW-IT system extracts knowledge from texts and builds knowledge bases automatically. The knowledge representation constructed by the KNOW-IT system consists of sets of concept-relation-concept (CRC) triples and relation-concept (RC) tuples.

Outgoing messages received by boundary controller 100 are input to real-time processing system 102. Meta-information interpreter 124 receives an outgoing message and parses the message into functional fields or elements such as message sender, message recipient, sender's security clearance level, recipient's security clearance level, time stamp of the message, and other administrative information and meta-information. As previously stated, the meta-information may vary for different types of outgoing messages or may even vary for the same type of outgoing messages. The message may then be indexed based on the functional fields and stored in outgoing message database 126. The information stored in outgoing message database 126 is used during the message classification process and also provides an audit trail of outgoing messages. Outgoing message database 126 may also offer text searching capabilities and allow users of the present invention to retrieve messages or portions of messages using ad hoc queries.

The information retrieved from the outgoing message is then forwarded to knowledge extraction system 128 for further processing. Knowledge extraction system 128 extracts knowledge representations from the outgoing message information and constructs a semantic model for the outgoing message using the extracted knowledge representations. Knowledge extraction system 128 may be the same as or different from knowledge extraction system 128 used for constructing semantic models for the various message categories. Using the same knowledge extraction system ensures that the semantic models constructed for the message categories and the outgoing messages have the same underlying structure which facilitates comparisons, even when different words and syntax are used in the message category descriptions and in the outgoing message. In one embodiment of the present invention, the "KNOW-IT" system developed by Textwise LLC of Syracuse may be used as knowledge extraction system 128.

The outgoing message semantic model is then passed to comparator and classifier 130 which assesses the degree of similarity between the message semantic model and message category semantic models stored in message category semantic model database 122. The similarity measure is based on a matching algorithm which matches the outgoing message semantic model representations against representations of the message category semantic models. If the degree of similarity exhibited between a message category semantic model and the outgoing message semantic model is higher than the threshold degree of similarity metric for that message category, then the outgoing message may be classified as belonging to that message category. Unclassified messages may be forwarded to manual message inspector 136 for manual classification.

The outgoing message classification information is then passed to security checker 132 which determines whether the distribution of the outgoing message to its recipients violates a user-defined security policy. In one embodiment, security checker 132 may determine the security clearance level for the message category and compare it to the security clearance levels of the sender and the recipients. If the security clearance levels of the sender or recipients are lower that the security clearance level of the corresponding message category, the distribution of the message to one or more recipients may be prohibited.

The present invention may be configured to perform user-defined procedures based on whether or not a message violates a security policy. Outgoing message which violate a security policy may be stored in a rejected message database 134. Several other procedures may be defined to deal with messages which violate a security policy. If no security policy is violated, the outgoing message may be forwarded to a mail server 140, for example a POP server, for distribution to its recipients. In specific embodiments of the present invention, the functionality of security checker 132 may be incorporated into comparator and classifier 130.

In one embodiment of the present invention shown in FIG. 6, outgoing messages which cannot be classified by comparator and classifier 130 are forwarded to manual message inspector 136 for manual inspection and classification by the user or a security officer. Manual message inspector 136 provides a graphical user interface (GUI) which can display information about the unclassified message to facilitate classification of the message by the user. Information displayed by manual message inspector 136 may include the message text or sections thereof which showed some similarity with one or more message categories, information about one or more message categories which showed similarity with the message or sections thereof, the reason for the similarity, meta-information about the message, security clearance levels of the message category and the message, and other information which facilitates manual classification of the message. The user may use this information to manually classify the message into one or more message categories. After the user manually classifies the message, the message may be forwarded to security checker 132 for further processing.

In alternate embodiments of the present invention, manual message inspector 136 also allows the user to indicate if the message violates a security policy. Messages which violate a security policy maybe in stored rejected message database 134 and processed according to predefined procedures. Messages which do not violate any security policy may be forwarded to mail server 140, for example a POP server, for distribution to its recipients.

In a specific embodiment of the present invention, copies of manually classified messages may also be forwarded to supervised learner module 138. Supervised learner module 138 is a machine learning subsystem which helps improve the precision and efficiency of the present invention. Supervised learner module 138 induces a classification model from the corpus of manually classified outgoing messages and uses the classification model to improve the precision and/or recall of the boundary controller as a whole. The rules output by supervised learner module 138 are used to enhance the performance of the present invention and to decrease its reliance on manual intervention.

Supervised learner module 138 is based on the premise that learning from data that could not be automatically classified and which is manually classified is an effective tool for improving automated classification. Supervised learner module 138 is based on a supervised learning algorithm. Learner 138 develops rules based on the manual classification and applies these rules to the message category semantic models stored in database 122. The rules are refined with every manually classified message passed to learner 138. Accordingly, over time, supervised learner module 138 enables the present invention to achieve high precision while minimizing the need for manual classification. As a result, learner 138 enables the present invention to reduce the amount of human intervention needed to check the distribution of outgoing messages.

Supervised learner module 138 may use several machine learning techniques to accomplish the machine learning process. In one embodiment of the present invention, the decision tree method is used for machine learning. After a message has been manually classified, learner module 138 builds a decision tree to represent the classification. This decision tree representation is then compared with semantic models of message categories with which the message showed some similarity. Based on the comparison, the semantic models of the particular message categories are updated to facilitate subsequent classification. If the user has indicated that the message violates a security policy, then that information is also incorporated into the decision tree.

A machine learning program such as the C4.5 program (Quinlan 1993) may also be used by the present invention. The C4.5 program decision tree is a directed acyclic graph (DAG), each of whose nodes contains a test to be applied to a case and each of whose leaves corresponds to a class to which a case is assigned. The cases from which C4.5 induces a decision tree consist of a set of attribute-value pairs and the class to which the case belongs. The assumption is that the attribute-value pairs explain/predict the membership of the case in the class. When given a sufficiently large number of cases, whose form has been antecedently specified, C4.5 will induce a decision tree which correctly classifies these cases and which predicts the class to which any new case will belong. The classes may correspond to the message categories and the CRC concepts may be used as the properties. Accordingly, in a specific embodiment of the present invention, the C4.5 program may be used to facilitate machine learning in order to reduce the amount of human intervention needed to check the distribution of outgoing messages. Supervised learner module 138 thus induces a classification model from the corpus of manually classified messages and uses the classification model to improve the precision and efficiency of the present invention as a whole.

As described above, the present invention is a modular meaning-based domain boundary controller which understands the semantic content of security classification guides, message categories, and outgoing messages. The present invention constructs semantic knowledge representations for a plurality of message categories and for outgoing messages and compares the semantic representations at the level of conceptual content. This is accomplished using natural language processing and information retrieval techniques, and knowledge-base technologies which enable the present invention to understand and synthesize rich, conceptual-level representations of the meanings of the message categories and the outgoing messages. This presents a significant advance over conventional boundary controllers based on "dirty word" lists which use simple keyword matches to perform boundary control. As a result, the present invention provides a customizable content-based information security tool which provides information security while substantially minimizing the number of human resources need to provide the information security.

The present invention provides a seamless information assurance environment which has several applications in different environments. For example, as described above, the present invention can be used in government or military settings to control the distribution of sensitive government/military information. The present invention may also be used in a corporate environment. For example, a corporation may be very interested in monitoring/controlling the distribution of inappropriate information such as trade secret information, hate messages, indecent materials, and racist messages, and other information which may expose the corporation to adverse legal actions, result in monetary losses, or even tarnish the corporation's reputation. The present invention may also be used as an automatic moderator for a newsgroup such as a Usenet newsgroup. Since there is a clear isomorphism between inappropriate newsgroup postings and messages with classified content, a metric, according to the present invention, may be defined to classify messages as appropriate/inappropriate or classified/unclassified. In general, the present invention may be used in several applications which classify information based on the contents of the information. Other applications known to one of ordinary skill in the art are also encompassed within the scope of this invention.

The present invention also provides clearly defined application programming interfaces (APIs) which enable it to be integrated within a large information assurance architecture. The flexibility offered by the present invention thus allows it to be incorporated as a component in a variety of architecture systems. For example, the present invention can function as an enclave boundary controller and as a classification domain boundary controller. The present invention can ensure that information is released on a "need to know" basis and that the interfaces between the different security levels are effectively policed. The present invention can also be used in conjunction with other systems such as the Conceptual Interlingua Document Retrieval (CINDOR) system developed by Textwise LLC of Syracuse which will allow the present invention to be used in multilingual environments. For further details on the CINDOR system please refer to U.S. patent application Ser. No. 08/696,701 filed Aug. 14, 1996 which issued as U.S. Pat. No. 6,006,221.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments, such as a distributed computer network environment, a single stand-alone computer system environment, or other computing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

References

Paik, W., Liddy, E. D., Yu, E. S. & McKenna, M. (1996). "Categorizing and standardizing proper nouns for efficient information retrieval." Corpus Processing for Lexicon Acquisition MIT Press.

Liddy, E. D., Paik, W., McKenna, M. & Yu, E. S. (1995). "A natural language text retrieval system with relevance feedback." Proceedings of the 16th National Online Meeting.

Liddy, E. D., Paik, W. & McKenna, M. (1995). "Development and implementation of a discourse model for newspaper texts." In Proceedings of the AAAI Symposium on Empirical Methods in Discourse Interpretation and Generation. Stanford, Calif.

Liddy, E. D. (1995). "Development and implementation of a discourse model for newspaper texts." Proceedings of the Dagstuhl on Summarizing Text for Intelligent Communication. Saarbruken, Germany.

Liddy, E. D. & Myaeng, S. H. (1994). "DR-LINK System: Phase I Summary." Proceedings of the TIPSTER Phase I Final Report.

Liddy, E. D., Paik, W., Yu, E. S. (1994). "Text categorization for multiple users based on semantic information from a MRD." ACM Transactions on Information Systems.

Liddy, E. D., Paik, W., Yu, E. S. & McKenna, M. (1994). "Document retrieval using linguistic knowledge." Proceedings of RIAO '94 Conference.

Liddy, E. D., Jorgensen, C. L., Sibert, E. E., Yu, E. S. (1993). "A sublanguage approach to natural language processing for an expert system." Information processing and management.

Liddy, E. D. (1993). "An alternative representation for documents and queries." Proceedings of the 14th National Online Meeting.

Paik, W., Liddy, E. D., Yu, E. S. & McKenna, M. (1993). "Categorizing and standardizing proper nouns for efficient information retrieval." Proceedings of the ACL Workshop on Acquisition of Lexical Knowledge from Text.

Liddy, E. D., McVearry, K., Paik, W., Yu, E. S. & McKenna, M. (1993). "Development implementation & Testing of a Discourse Model for Newspaper Texts." Proceedings of the ARPA Workshop on Human Language Technology, Princeton, N.J., Mar. 21–24, 1993.

Liddy, E. D. & Paik, W. (1992). "Statistically-guided word sense disambiguation." In Proceedings of AAAI Fall '92 Symposium on Probabilistic Approaches to Natural Language. Boston.

Liddy, E. D. (1991). "The discourse-level structure of empircal abstracts: An exploratory study." Information processing and management, 27:1, pp. 55–81.

Liddy, E. D. & Paik, W. (1991). "An intelligent semantic relation assigner." Proceedings of Workshop on Natural Language Learning. Sponsored by UCAI '91, Sydney, Australia Liddy, E. D. (1990). "Anaphora in natural language processing and information retrieval." Information processing and management. 26:1 pp. 39–52.

Liddy, E. D. (1988). "The discourse-level structure of natural language texts: An exploratory study of emirical abstracts." (Doctoral dissertation, Syracuse University).

Mitchell, Tom M. "Machine Learning." The McGraw-Hill Companies: New York, 1997.

Paik, Woojin. "Chronological Information Extraction System." In Proceedings of the Dagstuhl Seminar on Summarizing Text for Intelligent Communication. Saarbrucken, Germany, 1994.

Quinlan, J. Ross. "Discovering Rules by Induction from Large Collections of Examples." In D.

Michie (Ed.), "Expert Systems in the Micro Electronic Age." Edinburgh University Press, 1979.

"Learning Efficient Classification Procedures and their Application to Chess End Games." In R. S. Michalski, J. G. Carbonell, and T. M. Mitchell (Eds.), Machine Learning: An Artificial Intelligence Approach. San Mateo, Calif.: Morgan Kaufmann Publishers, 1983.

"C4.5: Programs for Machine Learning." San Mateo, Calif.: Morgan Kaufmann Publishers, 1993.

Sowa, John. *"Conceptual Structures: Information Processing in Mind and Machine."* Reading, MA: Addison-Wesley, 1984.

What is claimed is:

1. A computer-implement method of controlling distribution of a message from a sender to a recipient, the method comprising:

constructing semantic models for a plurality of message categories;

constructing a semantic model for the message;

comparing the semantic model of the message with the semantic models for the plurality of message categories;

classifying the message based on the comparison; and determining if the message can be distributed to the recipient based on the classification of the message.

2. The method of claim 1 wherein constructing the semantic models for the plurality of message categories comprises:

receiving descriptions for the plurality of message categories;

receiving text segments from a natural language processing information retrieval system based on the descriptions;

extracting knowledge representations from the text segments; and constructing the semantic models for the plurality of message categories using the knowledge representations.

3. The method of claim 2 wherein the semantic models for the plurality of message categories include concept-relation-concept (CRC) triples and relation-concept (RC) tuples.

4. The method of claim 2 wherein receiving the text segments from the natural language processing information retrieval system based on the descriptions comprises:

extracting concepts for each message category from the descriptions;

submitting the concepts as queries to a natural language processing information retrieval system; and receiving the text segments from the natural language processing information retrieval system relevant to the queries.

5. The method of claim 2 wherein extracting the concepts for each message category comprises using a lexical database to expand the concepts extracted from the descriptions.

6. The method of claim 2 wherein the natural language processing information retrieval system has access to a corpus of documents relevant to the plurality of message categories.

7. The method of claim 1 wherein constructing the semantic model for the message comprises:

parsing the message to extract meta-information and text information from the message;

extracting knowledge representations from the text information and the meta-information; and constructing the semantic model for the message using the knowledge representations.

8. The method of claim 7 wherein the meta-information includes information about the sender, information about the recipient, security information for the sender, and security information for the recipient.

9. The method of claim 7 wherein the semantic model for the message includes concept-relation-concept (CRC) triples and relation-concept (RC) tuples.

10. The method of claim 1 wherein comparing the semantic model of the message with the semantic models for the plurality of message categories comprises determining a degree of similarity between the semantic model of the message and the semantic model for each message category in the plurality of message categories.

11. The method of claim 10 wherein classifying the message based on the comparison comprises:

providing a threshold degree of similarity; and classifying the message as belonging to a message category if the degree of similarity between the semantic model of the message and the semantic model of the message category exceeds the threshold degree of similarity.

12. The method of claim 11 wherein the degree of similarity is user-defined.

13. The method of claim 11 wherein providing the threshold degree of similarity comprises providing degree of similarity thresholds for each message category of the plurality of message categories.

14. The method of claim 11 wherein providing the threshold degree of similarity comprises providing a single degree of similarity threshold for the plurality of message categories.

15. The method of claim 10 wherein classifying the message based on the comparison comprises:

providing a threshold degree of similarity; and classifying the message as not belonging to any message category if the degree of similarity between the semantic model of the message and the semantic models of the plurality of message categories is lower than the threshold degree of similarity.

16. The method of claim 15 further comprising:

providing a graphical user interface;

displaying information about the message on the graphical user interface; and manually classifying the message as belonging to a message category using the graphical user interface.

17. The method of claim 16 wherein displaying the information about the message on the graphical user interface comprises:

displaying sections of the message which showed some similarity with the message categories;

displaying the message categories with which the message showed some similarities; and displaying reasons for the similarities.

18. The method of claim 16 further comprising:

forwarding the manually classified message and the manual classification information to a machine learning module; and updating the semantic model of the message category to which the message was manually classified based on the manual classification information.

19. The method of claim 1 wherein determining if the message can be routed to the recipient comprises:

providing a security policy;

determining if the message violates the security policy based on the classification of the message; and permitting distribution of the message to the recipient if the security policy is not violated.

20. The method of claim 19 wherein determining if the message violates the security policy comprises:

determining a security clearance level for the sender;

determining a security clearance level for the message category to which the message was classified; and indicating that the message violates the security policy if the security clearance level of the sender is lower than the security clearance level of the message category.

21. The method of claim 19 wherein determining if the message violates the security policy comprises:
   determining a security clearance level for the recipient;
   determining a security clearance level for the message category to which the message was classified; and
   indicating that the message violates the security policy if the security clearance level of the recipient is lower than the security clearance level of the message category.

22. The method of claim 1 wherein determining if the message can be routed to the recipient comprises:
   providing a security policy;
   determining if the message violates the security policy based on the classification of the message; and
   prohibiting distribution of the message to the recipient if the security policy is violated.

23. A computer program product for controlling distribution of a message from a sender to a recipient, the computer program product comprising:
   code for constructing semantic models for a plurality of message categories;
   code for constructing a semantic model for the message;
   code for comparing the semantic model of the message with the semantic models for the plurality of message categories;
   code for classifying the message based on the comparison;
   code for determining if the message can be distributed to the recipient based on the classification of the message; and
   a computer-readable medium for storing the codes.

24. The computer program product of claim 23 wherein the code for constructing the semantic models for the plurality of message categories comprises:
   code for receiving descriptions for the plurality of message categories;
   code for receiving text segments from a natural language processing information retrieval system based on the descriptions;
   code for extracting knowledge representations from the text segments; and
   code for constructing the semantic models for the plurality of message categories using the knowledge representations.

25. The computer program product of claim 24 wherein the semantic models for the plurality of message categories include concept-relation-concept (CRC) triples and relation-concept (RC) tuples.

26. The computer program product of claim 24 wherein the code for receiving the text segments from the natural language processing information retrieval system based on the descriptions comprises:
   code for extracting concepts for each message category from the descriptions;
   code for submitting the concepts as queries to a natural language processing information retrieval system; and
   code for receiving the text segments from the natural language processing information retrieval system relevant to the queries.

27. The computer program product of claim 24 wherein the code for extracting the concepts for each message category comprises code for using a lexical database to expand the concepts extracted from the descriptions.

28. The computer program product of claim 24 wherein the natural language processing information retrieval system has access to a corpus of documents relevant to the plurality of message categories.

29. The computer program product of claim 23 wherein the code for constructing the semantic model for the message comprises:
   code for parsing the message to extract meta-information and text information from the message;
   code for extracting knowledge representations from the text information and the meta-information; and
   code for constructing the semantic model for the message using the knowledge representations.

30. The computer program product of claim 29 wherein the meta-information includes information about the sender, information about the recipient, security information for the sender, and security information for the recipient.

31. The computer program product of claim 29 wherein the semantic model for the message includes concept-relation-concept (CRC) triples and relation-concept (RC) tuples.

32. The computer program product of claim 23 wherein the code for comparing the semantic model of the message with the semantic models for the plurality of message categories comprises code for determining a degree of similarity between the semantic model of the message and the semantic model for each message category in the plurality of message categories.

33. The computer program product of claim 32 wherein the code for classifying the message based on the comparison comprises:
   code for providing a threshold degree of similarity; and
   code for classifying the message as belonging to a message category if the degree of similarity between the semantic model of the message and the semantic model of the message category exceeds the threshold degree of similarity.

34. The computer program product of claim 33 wherein the degree of similarity is user-defined.

35. The computer program product of claim 33 wherein the code for providing the threshold degree of similarity comprises code for providing degree of similarity thresholds for each message category of the plurality of message categories.

36. The computer program product of claim 33 wherein the code for providing the threshold degree of similarity comprises code for providing a single degree of similarity threshold for the plurality of message categories.

37. The computer program product of claim 32 wherein the code for classifying the message based on the comparison comprises:
   code for providing a threshold degree of similarity; and
   code for classifying the message as not belonging to any message category if the degree of similarity between the semantic model of the message and the semantic models of the plurality of message categories is lower than the threshold degree of similarity.

38. The computer program product of claim 37 further comprising:
   code for providing a graphical user interface;
   code for displaying information about the message on the graphical user interface; and
   code for manually classifying the message as belonging to a message category using the graphical user interface.

39. The computer program product of claim 38 wherein the code for displaying the information about the message on the graphical user interface comprises:
 code for displaying sections of the message which showed some similarity with the message categories;
 code for displaying the message categories with which the message showed some similarities; and
 code for displaying reasons for the similarities.

40. The computer program product of claim 38 further comprising:
 code for forwarding the manually classified message and the manual classification information to a machine learning module; and
 code for updating the semantic model of the message category to which the message was manually classified based on the manual classification information.

41. The computer program product of claim 23 wherein the code for determining if the message can be routed to the recipient comprises:
 code for providing a security policy;
 code for determining if the message violates the security policy based on the classification of the message; and
 code for permitting distribution of the message to the recipient if the security policy is not violated.

42. The computer program product of claim 41 wherein the code for determining if the message violates the security policy comprises:
 code for determining a security clearance level for the sender;
 code for determining a security clearance level for the message category to which the message was classified; and
 code for indicating that the message violates the security policy if the security clearance level of the sender is lower than the security clearance level of the message category.

43. The computer program product of claim 41 wherein the code for determining if the message violates the security policy comprises:
 code for determining a security clearance level for the recipient;
 code for determining a security clearance level for the message category to which the message was classified; and
 code for indicating that the message violates the security policy if the security clearance level of the recipient is lower than the security clearance level of the message category.

44. The computer program product of claim 23 wherein the code for determining if the message can be routed to the recipient comprises:
 code for providing a security policy;
 code for determining if the message violates the security policy based on the classification of the message; and
 code for prohibiting distribution of the message to the recipient if the security policy is violated.

45. A system for controlling distribution of a message from a sender to a recipient, the system comprising:
 a processor;
 a memory coupled to the processor, the memory configured to store a plurality of modules for execution by the processor, the modules including:
  a first module for constructing semantic models for a plurality of message categories;
  a second module for constructing a semantic model for the message;
  a comparator module for comparing the semantic model of the message with the semantic models for the plurality of message categories;
  a classifier module for classifying the message based on the comparison; and
  a security module for determining if the message can be routed to the recipient based on the classification of the message.

46. A system for controlling distribution of a message from a sender to a recipient, the system comprising:
 a batch processing subsystem configured to construct semantic models for a plurality of message categories; and
 a real time processing subsystem configured to construct a semantic model for the message, the real-time processing subsystem including;
 a comparator subsystem configured to compare the semantic model of the message with the semantic models for the plurality of message categories;
 a classifier subsystem configured to classify the message based on the comparison; and
 a security subsystem configured to determine if the message can be routed to the recipient based on the classification of the message.

47. The system of claim 46 wherein the batch processing subsystem further comprises:
 a parser and semantic tagger configured to receive descriptions for the plurality of message categories and to extract concepts for each message category from the descriptions;
 a natural language processing information retrieval system configured to receive the concepts as queries and to generate text segments relevant to the queries, the text segments being extracted from a document collection;
 a knowledge extraction subsystem configured to extract knowledge representations from the text segments and to construct the semantic models for the plurality of message categories using the knowledge representations.

48. The system of claim 46 wherein the real-time processing subsystem further comprises:
 an information interpreter configured to parse the message and extract meta-information and text information from the message;
 a knowledge extraction system configured to extract knowledge representations from the text information and the meta-information, and to construct the semantic model for the message using the knowledge representations.

49. The system of claim 46 wherein:
 the comparator subsystem is configured to determine a degree of similarity between the semantic model of the message and the semantic models for each message category in the plurality of message categories; and
 the classifier subsystem is configured to classify the message as belonging to a message category if the degree of similarity between the semantic model of the message and the semantic model of the message category exceeds a threshold degree of similarity.

50. The system of claim 46 wherein:
 the comparator subsystem is configured to determine a degree of similarity between the semantic model of the message and the semantic model for each message category in the plurality of message categories; and the classifier subsystem is configured to classify the message as not belonging to any of the message categories in the plurality of message categories if the degree of similarity between the semantic model of the message and the semantic models of the plurality of message categories is lower than a threshold degree of similarity.

51. The system of claim 50 further comprising a user interface module configured to display information about the message and to allow manual classification of the message as belonging to a message category from the plurality of message categories.

52. The system of claim 51 further comprising a machine learning subsystem configured to receive the manually classified message and to update the semantic model of the message category to which the message was manually classified.

53. The system of claim 46 wherein the security subsystem is further configured to determine if the message violates a security policy, and to permit distribution of the message to the recipient if the security policy is not violated.

54. The system of claim 53 wherein the security subsystem determines if the message violates a security policy by determining a security clearance level for the sender, a security clearance level for the sender, and a security clearance level for message category to which the message was classified, and indicating that the message violates the security policy if the security clearance level of the sender or recipient is lower than the security clearance level of the message category.

55. The system of claim 46 wherein the security subsystem is further configured to determine if the message violates a security policy, and to prohibit distribution of the message to the recipient if the security policy is violated.

* * * * *